(12) United States Patent
Breen (10) Patent No.: US 7,941,354 B2
(45) Date of Patent: May 10, 2011

(54) METHOD AND SYSTEM FOR LEASE OF ASSETS, SUCH AS TRAILERS, STORAGE DEVICES AND FACILITIES

(75) Inventor: Thomas B. Breen, Broomall, PA (US)

(73) Assignee: Asset Intelligence, LLC, Hackensack, NJ (US)

( * ) Notice: Subject to any disclaimer, the term of this patent is extended or adjusted under 35 U.S.C. 154(b) by 645 days.

(21) Appl. No.: 11/303,347

(22) Filed: Dec. 16, 2005

(65) Prior Publication Data

US 2007/0143207 A1    Jun. 21, 2007

(51) Int. Cl.
G06Q 40/00    (2006.01)
(52) U.S. Cl. .......................................... 705/35
(58) Field of Classification Search .................. None
See application file for complete search history.

(56) References Cited

U.S. PATENT DOCUMENTS

| | | | | |
|---|---|---|---|---|
| 5,068,656 | A | | 11/1991 | Sutherland .................... 340/989 |
| 5,726,884 | A | * | 3/1998 | Sturgeon et al. .................. 705/9 |
| 5,859,596 | A | * | 1/1999 | McRae .................... 340/870.02 |
| 6,044,364 | A | * | 3/2000 | DeFilippo et al. ............. 705/404 |
| 6,047,258 | A | | 4/2000 | Allison et al. ..................... 705/1 |
| 6,285,953 | B1 | * | 9/2001 | Harrison et al. .............. 701/213 |
| 6,384,717 | B1 | * | 5/2002 | DeVolpi ........................ 340/432 |
| 6,480,103 | B1 | * | 11/2002 | McCarthy et al. ......... 340/425.5 |
| 6,542,077 | B2 | * | 4/2003 | Joao .......................... 340/426.16 |
| 6,584,450 | B1 | * | 6/2003 | Hastings et al. ................ 705/26 |
| 6,665,613 | B2 | | 12/2003 | Duvall .......................... 701/213 |
| 6,673,479 | B2 | * | 1/2004 | McArthur et al. ............... 429/12 |
| 6,714,857 | B2 | | 3/2004 | Kapolka et al. ............... 701/123 |
| 6,721,652 | B1 | | 4/2004 | Sanqunetti .................... 701/207 |
| 6,873,840 | B1 | * | 3/2005 | von Alten ...................... 455/410 |
| 7,124,059 | B2 | * | 10/2006 | Wetzer et al. .................. 702/184 |
| 2001/0051787 | A1 | * | 12/2001 | Haller et al. ..................... 604/66 |
| 2002/0022979 | A1 | * | 2/2002 | Whipp et al. ..................... 705/5 |
| 2002/0174077 | A1 | * | 11/2002 | Yui et al. ........................ 705/400 |
| 2002/0184062 | A1 | * | 12/2002 | Diaz ................................. 705/7 |
| 2002/0186144 | A1 | | 12/2002 | Meunier ................... 340/825.28 |
| 2003/0060938 | A1 | | 3/2003 | Duvall .............................. 701/2 |
| 2003/0120509 | A1 | * | 6/2003 | Bruch et al. ....................... 705/1 |

(Continued)

FOREIGN PATENT DOCUMENTS

WO    WO 01/83406 A2    11/2001

OTHER PUBLICATIONS

GE Veriwise for Refrigerated Van Trailers, highbeam.com/doc/1g1-135662116.html (attached, 2 pages).*

(Continued)

Primary Examiner — Alexander Kalinowski
Assistant Examiner — Bruce I Ebersman
(74) Attorney, Agent, or Firm — Lowenstein Sandler PC (57) ABSTRACT

A method and system of providing for the rapid availability of assets to customers wherein a lease method and system is provided which includes lease terms, a leasable asset with a unique identifier, associating the lease terms with the asset through the unique identifier, at least one sensor on the asset for detecting the status of at least one condition that starts a lease, a communications system for transmitting information from the sensors on the asset to a central management system, determining the amount due based on the status of the sensors and the lease terms associated with the unique identifier, and preparing an invoice based on the amount due determined.

16 Claims, 2 Drawing Sheets

A block diagram outlining a asset lease system

U.S. PATENT DOCUMENTS

| | | | |
|---|---|---|---|
| 2003/0209375 A1* | 11/2003 | Suzuki et al. | 180/65.3 |
| 2003/0221118 A1 | 11/2003 | Walker | 713/193 |
| 2004/0117619 A1* | 6/2004 | Singer et al. | 713/156 |
| 2004/0122688 A1* | 6/2004 | Janda | 705/1 |
| 2004/0162063 A1 | 8/2004 | Quinones et al. | 455/419 |
| 2004/0176965 A1* | 9/2004 | Winch et al. | 705/1 |
| 2004/0177032 A1 | 9/2004 | Bradley et al. | 705/38 |
| 2004/0193368 A1 | 9/2004 | Sanqunetti | 701/207 |
| 2005/0017855 A1 | 1/2005 | Harvey | 340/426.1 |
| 2005/0086127 A1 | 4/2005 | Hastings et al. | 705/26 |
| 2005/0102152 A1 | 5/2005 | Hodges | 705/1 |
| 2005/0108089 A1* | 5/2005 | Ehrman et al. | 705/13 |
| 2006/0259353 A1* | 11/2006 | Gutmann | 705/13 |
| 2007/0136083 A1* | 6/2007 | Simon et al. | 705/1 |

OTHER PUBLICATIONS ccj Refrigerated truck issue.*
Frozen Assets Commercial Carrier Journal, Arron Huff, Jun. 2004, 4 pages.*
Qualcomm Launches New Trailer Tracking, Fleet Owner, Nov. 1, 2004, Jim Mele.*
On the Trail of Trailers, Commercial Carrier Journal, V158, n6, p. 48, Jun. 2001, Linda Parham.*

* cited by examiner

FIG. 1. A block diagram outlining a asset lease system

Figure 2. Block Diagram of Method of Leasing

METHOD AND SYSTEM FOR LEASE OF ASSETS, SUCH AS TRAILERS, STORAGE DEVICES AND FACILITIES

FIELD OF THE INVENTION

The present invention is drawn to the field of asset leasing, including both moveable assets, such as trailers and storage containers, and fixed facilities, such as modular/mobile offices. More specifically, the present invention is drawn to a method and system of providing for the rapid availability of assets to customers wherein a lease method and system is provided which includes lease terms, a leasable asset, a geo-referencing system, sensors on the asset for determining the location of the asset and detecting the status of the asset, a device for transmitting information from the sensors on the asset to a central location, a device for receiving transmitted information from the sensors on the asset at a central location, and a management system which determines the availability of assets, allows for the immediate use of the assets, determines the billing rate based on use conditions of the asset, and provides billing information.

BACKGROUND OF THE INVENTION

In a conventional lease of an asset (such as a car, truck, trailer, construction equipment, construction trailer), a user picks up or has an asset delivered at a specified time, which starts the lease. The user later returns the asset or has that asset picked up by the owner, at the end of the lease. The lease fee for the movable asset is usually determined from the period of time between the start of the lease, when the asset is picked up or delivered, and the end of the lease, when the asset is picked up by the owner or returned to a return location by the user. The user pays a lease fee for the total time between the start and end of the lease. In a conventional lease it may also be possible that the lease terms allow for the asset to be returned to a different location than from the location where the asset was rented, although this may involve additional fees.

It is common for a flat fee to be charged depending on the length of the lease period. For most assets, flat-fee leases generally fall into two categories, short-term and long-term. The lease period in short term leases generally run from hours to weeks, while long term leases generally run from months to years. In short term leases it is common that the shorter the lease period, the higher the relative fee. For example, a one day car rental fee is generally higher than $1/7^{th}$ of a weekly rental fee. The calendar days on which car rentals occur also affects lease rates, as there are generally lease rate differences between weekend rentals and during the work week rentals. Seasonal differences may also exist, due to increased demand during certain seasons and decreased demand in other seasons. In a long-term lease contract, a user rents an asset for a relatively longer period of time, such as three to five years, compared to the time in a short term lease. In some cases, the lease fee, while being fixed, may also be dependent on the number of miles driven using the asset, in the case of movable assets.

There are many problems inherent with the conventional leasing of assets. For example, it is sometimes difficult for a lessee to initiate a lease because it is not located near a lending location, or because there are a limited number of lending locations. If that is the case, it is difficult or impossible for a lessee to flexibly and effectively use the assets. In order to rent assets according to a clear and economical fee structure, there is a demand for a system which allows assets to be readily accessible by allowed users.

Another problem associated with the lease of assets under a conventional system is the need to transport the asset to the owners storage area at the end of the lease. When the lease is to a lessee who rents a large number of assets, considerable resources are spent transporting assets back to storage areas when the lease expires, only to have those assets later returned to the same customer for a new lease. This results in increased costs, because, depending on the lease arrangement, either the owner of the asset or the lessee has costs associated with transporting assets back to storage yards. It would be desirable to have a system where the lessor does not need to continuously cycle unused assets between a customer and a storage area, while allowing customers to pay on a lease only when the asset is actually used.

Another drawback of conventional lease systems is that they are not structured to allow the use of assets, such as trailers, in different ways. For example, while a trailer can be used to transport goods between sites, it can also be used for storage at a lessee's site. This is a typical use before a holiday, such as prior to the Christmas holidays, when large volumes of merchandise may be shipped from manufacturers to distributors and/or retailers so that they have merchandise readily available to meet the holiday demand. The goods are often stored in trailers until needed to replenish store stocks. As the season progresses and goods are moved from trailers to the stores, empty trailers become available, which, under a conventional lease system, would then need to be transported to the owners storage facility. Otherwise the customer would continue to incur additional rental fees for simply having the trailer on its property. A leasing system which would allow trailers to be used to ship goods, then remain as storage units at the site of the customer, while allowing the customer to be billed only for time the storage unit is used, is highly advantageous.

A number of systems have recently been developed which attempt to overcome some of the potential troubles with the conventional leasing system, but none discloses a complete leasing system with the flexibility of the present invention. Yui, et al. (US20020174077) describe a movable body rental management system that can calculate a fee for leasing a movable body. Each vehicle to be rented, such as a car or bicycle, has the capability to detect its own current position at a specified time interval by use of GPS (Global Positioning System). The system transmits information on the current position of the vehicle to a central station which manages the vehicles. When each of vehicles is rented, the system starts measuring the distance and time the vehicle travels. When the use of the vehicle ends, the lease fee is calculated according to the transmitted traveling distance and traveling time. This application discloses a system for rental fees based on mileage driven and travel time. The application does not describe a lease method or system that considers conditions that start a lease for stationary assets, and does not describe a leasing method or system that uses sensors to establish different lease rates for different types of uses of an asset.

Meunier (US 20020186144) describes an automated vehicle rental system for a fleet of rental vehicles, where the vehicles are geographically distributed and normally parked locked in an unguarded location when not rented. A communications system enables communication to and from the vehicle and user-carried electronic devices. An on-board unit (OBU) located on each vehicle interfaces with the vehicle communications unit and with a door unlocking mechanism. A central reservations, management and location system is linked to a database containing the location and availability of each vehicle and a rate for rental for that vehicle. The central system communicates with the OBU on each vehicle. The user accesses the vehicle using a key borne by the user. This application discloses a system for providing access to vehicles which have an on-board unit linked to a door unlocking mechanism, in which the user has a key to access the vehicle, but does not describe a leasing method or system that uses sensors to start a lease and to establish different lease rates for different types of uses of an asset.

U.S. Pat. No. 6,873,840 to von Alten describes an access/monitoring/return system with which a user can be permitted to temporarily use a resource such as a rental car. The system can receive user identity information with an identity confirmation device of the resource, confirm the identity of the user with a security device of the resource, provide the user with access to the resource, monitor and record information about use of the resource with a monitoring system of the resource, reacquire the resource from the user, and obtain resource use information from the resource monitoring system of the resource. This system is limited to providing access to rental assets, where information stored by the system is stored locally on the asset and only retrieved when the asset is returned to the rental station, and does not describe a leasing method or system that uses a communications system and sensors to start a lease and to establish different lease rates for different types of uses of an asset.

Quinones, et al. (US20040162063) describe a method and apparatus for conditioning the access of a user of a remotely-accessible device, which tracks and monitors objects, by using a preprogrammed expiration time and date and comparing that to a reliable time and date source, such as a time and date received from a global positioning system receiver, and disabling the processing of signals of the remotely-accessible device if the time and date comparison reveals that the license, service, lease, rental or commodity agreement has expired. This system is limited to providing access to, and return/recovery, of rental assets and does not describe a leasing method or system that uses sensors to start a lease and to establish different lease rates for different types of uses of an asset.

Ehrman et al. (US 20050108089) describe an automated vehicle rental system for tracking vehicles in a rental lot and providing information on the status of each vehicle. Each vehicle contains sensors for determining the vehicle mileage, state of the fuel level in the tank and the position of the vehicle in the rental lot. This information is linked to vehicle check out and billing systems. This system is limited to rental conditions of vehicles based on mileage driven and fuel consumption, where the communications that monitors the movement of an asset is relatively short-range and limited to an area surrounding the rental location. There is no provision for starting a lease at a remote location using a long-range communications system or other conditions other than movement, or adjusting the least rate for particular use conditions.

It would therefore be desirable to provide a method and system for the leasing of assets where leaseable assets can be readily accessible to users after a lease is signed. Therefore, what is needed is a system for leasing assets where operating costs are reduced by minimizing manpower needs by remotely monitoring conditions associated with the lease of the asset. The system should also be able to encompass a wide variety of conditions which affect the fees due the owner of the asset by being able to monitor any condition present in the lease. The system should be able to automatically determine payments to the owner of the asset based on conditions of the lease and monitoring of those conditions by sensors on the asset.

BRIEF DESCRIPTION OF THE INVENTION

Accordingly, the present invention is directed to a leasing system for leaseable assets that substantially obviates one or more of the problems due to limitations and disadvantages of the related art.

The present invention provides a leasing system that utilizes remote monitoring of the asset to determine when an asset is being used.

The present invention also provides a leasing system where different conditions of use can be remotely monitored by sensors on the asset and the fees charged depend upon the terms of the lease and the actual conditions of use.

Additional features and advantages of the invention will be set forth in the description which follows, and in part will be apparent from the description, or may be learned by practice of the invention. Other advantages of the invention will be realized and attained by the structure particularly pointed out in the written description and claims hereof as well as the appended drawings.

To achieve these and other advantages and in accordance with the purpose of the present invention, as embodied and broadly described, a leasing system is provided that reduces operating costs by minimizing overhead costs through the use of sensors on the asset which can remotely verify and monitor the time and conditions of use in a leaseable asset.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention, and are incorporated in and constitute a part of this specification, illustrate embodiments of the invention and, together with the description, serve to explain the principles of the invention. In the drawings.

The features and advantages of the automated leasing system of the present invention will be more clearly appreciated from the following description taken in conjunction with the accompanying drawings.

DETAILED DESCRIPTION OF THE INVENTION

Reference will now be made in detail to an embodiment of the present invention, example of which is illustrated in the accompanying drawings. The present invention provides a lease system for use with mobile assets and a method of using the lease system, which allows for the rapid availability of assets to customers. The lease system includes lease terms, a leasable asset, a geo-referencing system, sensors on the asset for determining the location of the asset and detecting the status of conditions on the asset, a device for transmitting information from sensors on the asset to a central location, a device for receiving transmitted information from sensors on the asset at a central location, and a management system which monitors the conditions of the asset based on the status of sensors on the asset, determines the billing rate based on use conditions of the asset, and provides billing information.

Figure 1:
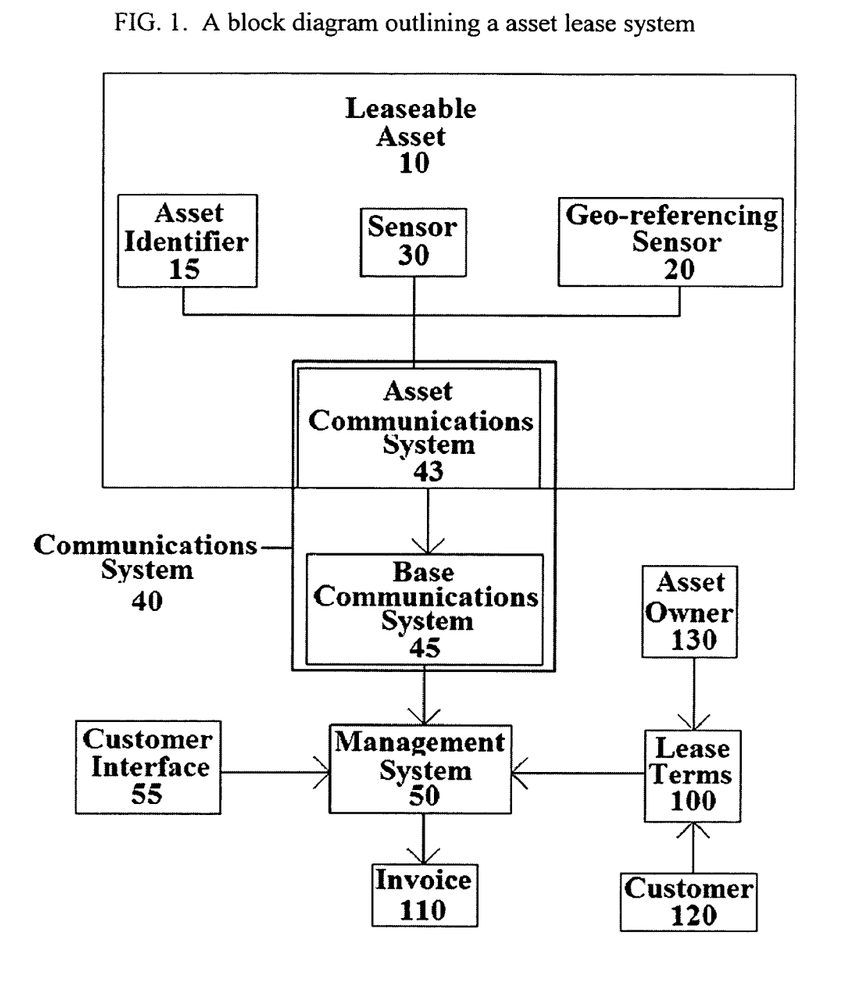
FIG. 1 is a block diagram outlining a system for the present invention.

FIG. 1 shows a system that may be used to practice the method of the present invention. An asset owner 130 and the customer 120 negotiate lease terms 100 for an asset. The lease terms 100 include at least one term related to a condition on the asset 10 which can be remotely monitored. An asset 10 to be leased, which is identified by a unique asset identifier 15, is provided. The use of a unique asset identifier 15 allows more than one asset to be leased according to the system and method of the invention, and allows each asset to potentially have different lease terms associated with it. The lease terms for a particular asset are associated with the asset through the unique identifier.

The asset 10 is equipped with at least one sensor 30 that provides information on the status of a condition on the asset which is related to at least one lease term 100. In one embodiment, a geo-referencing sensor 20 for determining the geographic location of the asset, such as a GPS receiver, is also a sensor on the asset 10. Sensor 30 can be any sensor that provides information on the status of a condition on the asset including current sensors, door sensors, temperature sensors, content sensors, and motion sensors such as accelerometers.

Geo-referencing sensor 20 and sensor 30 are linked to a communications transmission system 40. In one embodiment the sensors are linked to the communications transmission system through a controller (not shown). The controller could control the timing of the communications and routes signals from various sensors (e.g., hatch switch, motion sensor, tracking device) to the communications device. In one embodiment, the controller includes a clock which will enable it to cause the transmission of information at specified times. The controller will also have sufficient memory and throughput capability to process data acquired from the sensors to which it is connected. The controller and communications device (as well other electrically-powered devices within the system such as a tracking device) are powered by a battery (not shown) or hard-wired to the electrical system of the train or tractor to which the tank car is attached. In one embodiment each device can have a separate battery, or a single battery can be used to power all of the electrically-powered devices on the tank car. In another embodiment, a solar panel or other energy harvesting device may be used to power the devices or charge batteries that power the devices. For assets 10 needing wireless communications, the communications system 40 can be cellular or mobile system based, mobile data network based, satellite based, or other wireless method of communication. For assets 10 that remain fixed at the customer's site during use, the communications transmission system 40 may be hard-wired, such as a telephone line to a modem within the asset, or wireless. Communications transmission system 40 may consist of a transmitter or transceiver at the asset 43, and a receiver or transceiver at the management system 45.

The communications system facilitates the transmission from the asset 10 to the management system 50 the asset identifier 15 and the status of sensors 30 along with geographic location information from geo-referencing sensor 20, if this sensor is used, to the management system 50, which has information on the lease terms 100 that were negotiated between the asset owner 130 and the customer 120. Management system 50 periodically calculates the amount due from the customer by considering the asset identifier 15, the status of sensors 30, and, if relevant to the lease terms, the geographic location of the asset as determined from geo-referencing sensor 20 with the lease terms 100. Management system 50 periodically produces an invoice 110 which is transmitted to the customer 120. The frequency of calculation of the amount due and invoice generation can be a lease term agreed to by the owner of the asset and the customer.

Management system 50 may also include a customer interface 55 that allows a customer to view information such as the availability of assets, the location of assets, the status of its leases for assets, and the amount due on its leases. The interface 55 can be a web-based interface or a direct interface through a computer or handheld device.

Figure 2:
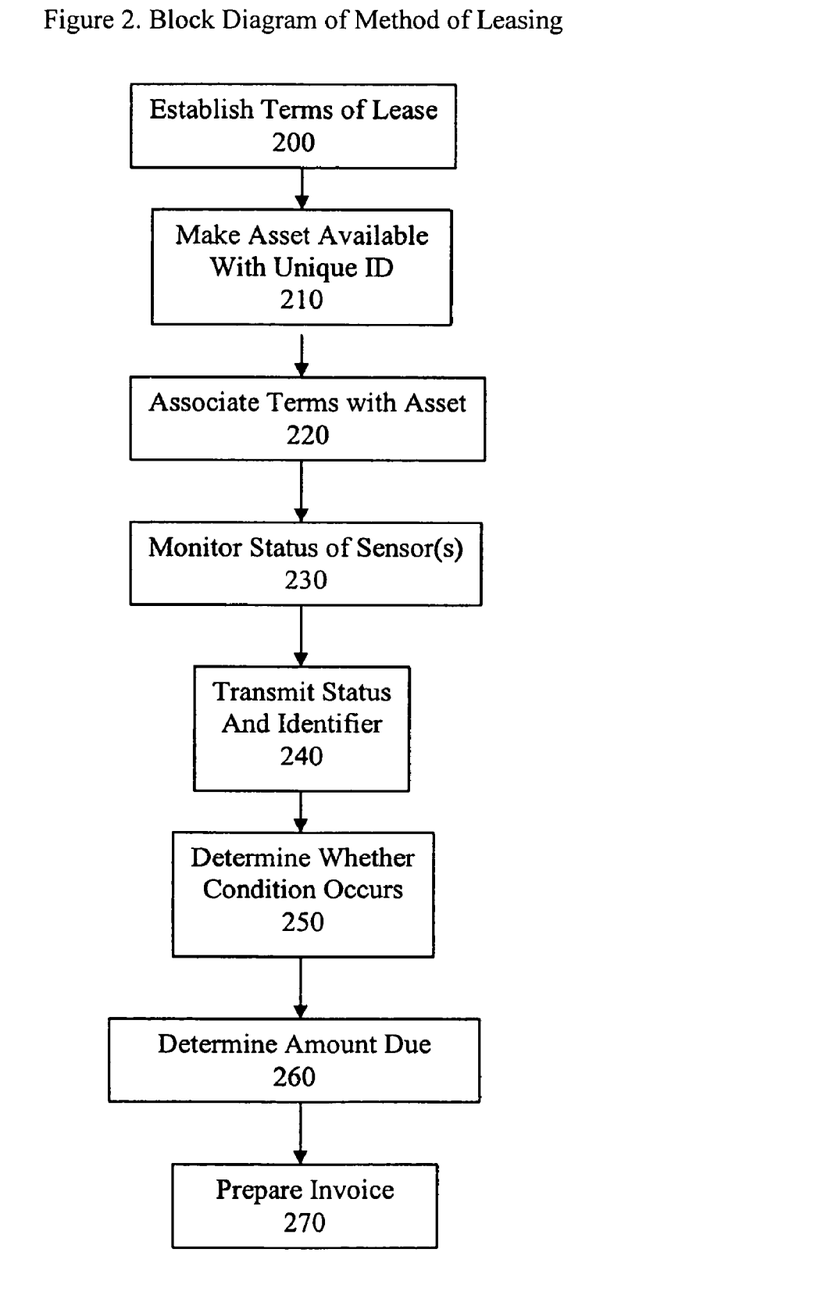
FIG. 2 is a block diagram of a method of leasing of the present invention.

FIG. 2 shows the method of the current application. Lease terms 100, which includes the lease rate (which may be fixed or variable) and any conditions that start the lease, affect the lease rate, or end the lease are initially established 200. Lease terms 100 may include the duration of the lease, which indicates the time period over which an asset 10 is available for use by a customers. In one embodiment, the duration of the lease is a set time period (e.g., one month, 6 months, one year) agreed upon by the owner of the asset and the Customer as one of the terms of the lease. In that embodiment, the fixed lease term is set upon the start of the lease, and the Customer has use of the asset for the entire term, during which the lease rate may change according to use if any conditions that affect the lease rate were established. In another embodiment, the owner of the asset and the Customer can provide for an open lease term that ends upon the occurrence of a condition that ends the lease. For example, the lease terms can provide that the lease does not end until the asset is returned to the owner's storage yard. In either embodiment, the parties can also agree to lease terms concerning when invoices are calculated and sent to the Customer. Where a short lease term is used, such as 6 months, the parties may decide that monthly invoices are appropriate. Where a long lease term is used, such as 5 years, the parties may decide that a longer time frame is appropriate such as 6 months.

Conditions that can start, end, or affect the lease rate may also be terms of the lease, and are of a type that can be monitored by sensors 30 placed on the asset 10. Examples of conditions that can be used to start, end, or affect the lease rate, and which can verified by a sensor include, but are not limited to: the location of the asset a particular geographic location or within a specific geographic area (such as within a virtual geographic fence), which can be monitored with a geo-referencing sensor like GPS; the opening of a door on the asset, which can be monitored with a door switch sensor that indicates whether a door is open or closed; use of electricity within the asset, which can be monitored with a current meter on electrical equipment within the asset; motion of the asset, which can be monitored with a motion sensor; change in temperature of the asset, which can be monitored with a temperature sensor such as a thermometer; the use of a refrigeration unit on the asset, which can be monitored using a current sensor or a switch on the refrigeration unit; the presence of materials within the asset, which can be monitored using a contents sensor; the connection of the electrical pigtail of the asset to a trailer or other source of electrical power, which can be monitored with a switch on the pigtail that is actuated when it is connected to a source, or a current meter that measures the flow of current through the pigtail. It is to be understood that the present invention is not limited to the embodiments described above, but encompasses any and all embodiments within the scope of the following claims.

After the terms of the lease have been established, an asset 10 with a unique identification number 15 is made available to the customer 210. Each asset 10 will also have at least one sensor 30 that can be used to monitor 230 a condition(s) that starts the lease. The use of a unique asset identifier 15 allows more than one asset 10 to be leased according to the system and method of the invention, and allows each asset to potentially have different lease terms associated with it. Each sensor 30 on the asset, if there are more than one, is linked to a communications transmission system 43 on the asset. The link between the sensors and the asset transmission system can be through a controller (not shown), or the asset transmission system may have within it the functionality of a controller. Asset communications system 43 then transmits 240 to a communications system 45 at the management system the status of sensors 30 on the asset and the unique identifier of the asset. Management system 50 determines whether the lease has started by considering the status of the sensors 30 on the asset, and the lease terms 100 associated with the asset through the asset identification 15. After the lease has started, the management system 50 continues to monitor the status of sensors 30 on the asset 10 to determine whether any conditions that affect the lease rate have occurred, if any have been specified in the terms of the lease, and also whether any conditions that end the lease have occurred, if any have been specified in the terms of the lease. Periodically, the frequency of which can also be a lease term, an amount due by the customer is calculated 260 based on lease terms 100 associated with the unique identifier of the asset and the status of conditions on the asset sensed through the sensors 30. An invoice 110 can then be prepared 270 periodically or at the end of the lease, and the frequency at which invoices are prepared can also be a lease term.

In another embodiment of the present invention, the asset 10 also includes at least one sensor 30 that senses the status of at least one condition that affects the lease rate. In this embodiment, a condition that affects the lease rate is established when the lease terms 100 are established. The condition that affects the lease rate is one that can be monitored with a sensor 30 on the asset 10. For example, if the asset 10 is a trailer that has a refrigeration unit, the condition that affects the lease rate could be the use of the refrigeration unit. The lease terms 100 could be structured so that the condition that starts the lease is the opening of the trailer door, which establishes one lease rate for use of the trailer without the refrigeration, perhaps as storage at a customer's site. However, if the customer turns on the refrigeration unit, that would be sensed by a thermometer in the asset 100 or by a switch or current sensor on the refrigeration unit's electrical panel. The activation of those sensors 30 would trigger the use of a second lease rate that applies when the asset's refrigeration unit is used. Any number of conditions could be used as triggers that affect the lease rate, including, but not limited to: changing the lease rate upon the opening of a door on the asset (which may occur if the asset has several compartments, each with a separate door), which can be monitored with a door switch sensor that indicates whether a door is open or closed; changing the lease rate upon the use of electricity within the asset, which can be monitored with a current meter on electrical equipment within the asset; changing the lease rate upon motion of the asset, which can be monitored with a motion sensor, including an accelerometer; changing the lease rate upon a change in temperature of the asset, which can be monitored with a thermometer; or changing the lease rate upon the use of a refrigeration unit on the asset, which can be monitored using a current sensor or a switch on the refrigeration unit. It will be apparent to those skilled in the art that various sensors 30 can be used in monitoring the lease terms during use of the asset 10 in accordance with the present invention without departing from the spirit or scope of the invention. Thus, it is intended that the present invention cover the modifications and variations of this invention provided they come within the scope of the appended claims and their equivalents.

In one particular embodiment of a method using a condition that affects a lease rate, the condition that affects the lease rate is the geographic location of the asset 10. This embodiment is particularly useful when the lease terms 100 are structured so that one lease rate applies when the asset 10, such as a trailer, is used for stationary storage on a customer's premises, and a second lease rate applies when the asset 10 is used for transportation off of the customer's premises. A geo-referencing sensor 20, such as a GPS receiver, can measure the geographic location of the asset 10. The geo-referencing sensor can be a sensor already in use on the asset, hence, the use of a separate sensor for a condition that affects the lease rate is not always necessary. After the location of the asset is determined by the geo-referencing sensor, that information and the unique identifier of the asset is transmitted through the communications system to the management system, which determines whether a condition that affects the lease has occurred. If it has, the determination of the amount due is also based on the occurrence of that condition.

In a more specific embodiment of a system where the geographic location of the asset can be used as a condition that affects the lease rate, the location of the asset 10 is compared to the boundaries of the customer's facility or a storage yard, with a second lease rate being applied if the asset 10 has moved off of the customers property or the storage yard. In this embodiment, a virtual fence, also know as a geo-fence or a geographic boundary, can be used to help make that determination. A geo-fence is a defined geographical region to which the asset's location can be compared, to determine whether the asset is inside or outside of the geofence area. In this embodiment a determination that the asset's present location is outside of the geo-fence defining the customer's property or the storage yard would be a condition that affects the lease rate. In a first configuration, the geo-fence information is on the management system, and the comparison of the geo-fence to the actual location of the asset is made by the management system to determine whether the condition that affects the lease rate has occurred. In the first configuration the status of at least one condition that affects the lease is the actual location information that is transmitted to the management system. In a second configuration, the geofence information can be in a controller on the asset itself, and the controller can perform the comparison of the present location to the geo-fence information. After the comparison the controller can transmit to the management system information as to whether the asset is inside or outside of the geofence (or, if multiple geo-fences are on the controller, which geofence the asset is in). In the second configuration the status of at least one condition that affects the lease is the relative location of the asset compared to the geo-fence or which geo-fence the asset is in, rather than the exact location information.

In addition to establishing conditions that affect the lease rate, the asset owner 130 and the customer 120 can structure the initial lease terms 100 in various ways to facilitate a cost effective leasing arrangement for both parties. The lease terms 100 could provide any of a number of rate structures, including, but not limited to, lease rates where: (1) a fixed price is charged for a predetermined lease duration upon the start of the lease, during which time the customer has unlimited use of the asset; (2) a predetermined lease duration is set upon the start of the lease, but a usage rate is charged only when the asset is actually used during that duration; (3) a variable lease rate is charged over a fixed duration upon the start of the lease, where the rate charged depends upon the calendar dates encompassed by the lease duration and during which the customer has unlimited use of the asset; and (4) a variable lease rate is charged over a fixed duration, where the rate depends on the calendar dates encompassed by the lease, but where the customer is only charged for those dates on which the asset was actually used. Theoretically, any lease structure can be established by the asset owner and the customer to best suit the parties.

Importantly, the method of the invention operates with both fixed assets and mobile assets. In both cases, the amount due on the lease is determined by the lease rate terms, condition for starting the lease, and, if applicable, conditions affecting the lease rate.

For example, an asset 10 fixed at the customer's site, such as a trailer, modular office, emergency generator, or a container, is provided 210 to a customer 120, where the lease terms 100 state that the lease rate is at a fixed price per day the customer 120 uses the asset, the lease will begin when the trailer is first used and will continue for a period of three months from the date of first use. The lease starts when sensor 30 indicates the trailer is first being used. A door sensor 30 indicates that a door on the asset was opened, which starts the lease. A light sensor, such as a photocell, may also be used to indicate use of an asset. A sensor 30, such as an ultrasonic sensor indicates when material is stored within the asset 10. Management system 50 calculates the termination date of the lease, 3 months from the date of first use, based on the date of first use. Management system 50 uses status information from sensor 30, the ultrasonic sensor, to determine the number of days each month that material is stored in asset 10, and accordingly determines the amount due according to the terms of the lease.

Where the method of the invention is applied to movable assets 10, an embodiment that uses the geographic location of the asset 10, as determined by a geo-referencing sensor 20, such as a GPS locator, may be used as a condition that affects the lease rate. For example, a movable asset 10, such as a trailer that may be used by a customer 120 to transport goods, is provided to a customer 120. The lease terms 100 establish that the lease rate is variable, depending upon the whether the asset is used for transportation or for storage on the customers facility, and that the condition that starts the lease is the opening of a door on the asset 10. The lease begins when a door sensor 30 indicates that the trailer door has been opened, and continues for a period of three months from the date of first use. A geo-referencing sensor 20, such as a GPS locator, determines the position of the asset. The determination of whether the asset is on the customer's site can be made by comparing the location of the asset to a virtual fence (e.g. a geo-fence) that defines the boundary around the customer's site. That determination can be made either by equipment on the asset 10 or by the management system 50. Management system 50 then calculates the amount due by considering the lease start date, the lease rates, and the location of the asset. In other embodiments, the conditions affecting the lease rate could be the use of a refrigeration unit on the asset 10, the mileage traveled by the asset 10 (which can be determined by a geo-referencing sensor 20 or an odometer on the asset 10), or any other condition that can be determined by a sensor 30 on the asset 10. The lease rate could alternatively be structured to include a fixed rate, a rate dependent on the dates on which the asset as used, and any other rate structure desired by the customer 120 and the asset owner 130.

Importantly, the use of sensors 30 on the assets 10 gives the customer 120 and the asset owner 130 great flexibility in the deployment of the assets 10. In one embodiment, moveable or nonmoveable assets may be placed on a customer's property for use by the customer 120 at their convenience, according to the terms of lease terms 100 agreed to by the parties. This arrangement is advantageous to both the asset owner 130 and the customer 120, as it effectively allows the asset owner 130 to store some of its assets at customer sites, giving the customer 120 instant access to assets 10 as is needed, which is particularly important during critical shipping periods such as before holidays. The asset owner 130 benefits from this arrangement by being able to reduce manpower needs by not having to dispatch personnel to deliver the assets.

In another embodiment, the assets can be placed in a storage yard for access by the Customer. Lease terms can be negotiated between the owner and Customer ahead of time, or alternatively the Customer can select the lease terms on a computer terminal at the storage yard or through a customer interface to the management system. In this embodiment the Customer can pick up or return an asset at its convenience. The storage yard can be secure with a security card reader governing access to the yard, and the Customer can be given a security card that will allow the Customer access to the storage yard. In one embodiment the storage yard will have a computer terminal (or other device) that is connected to the management system. The Customer can use the device to specify what kind of asset it would like to pick up or return. In the case of a pickup, the device can tell the Customer the identification number of the asset in the storage yard that is being provided to the Customer. In one embodiment, the system can include a security measure under which the asset is electronically immobilized in the storage yard. This can be done by electronically engaging the brakes on the asset, or by otherwise rendering the asset immobile by a device that can be engaged and disengaged electronically. Once the Customer uses its security card to access the storage yard and is told which asset it may lease, the management system removes the immobilization from the asset, such as disengaging the airbrakes on an asset or otherwise disengaging an electronic immobilization device on the asset, by sending an appropriate electronic signal to the asset through the communications system. This would prevent the Customer from accidentally taking the wrong asset and would provide further security for the assets while they are in the storage yard.

In the case of a return of an asset by a Customer, the system can be configured in a number of ways to end the lease upon the return of the asset. This gives the owner and Customer the flexibility to end the lease when the asset is returned, if that is a desired aspect of the lease terms. In one embodiment, the storage yard has a security card reader that is connected to the management system, and the Customer's use of an appropriate security card to access the storage yard is then transmitted to the management system, which can be the trigger for ending the lease. In another embodiment, a geofence defining the border of the storage yard can be used to end the lease. If the tracking device on the asset indicates that the asset is within the storage yard, the lease is ended. In another embodiment, the use of the geofence can be combined with the use of the motion sensor, such that the lease is only ended if the motion sensor indicates that the asset has stopped moving within the storage yard for a predetermined amount of time. Any other embodiment that uses the status of a sensor to end the lease may be used.

In another embodiment of the method and system of the invention, the customer has access to a customer section of the management system through a web-based interface. The interface may allow the customer to view all of the assets the customer is leasing, the lease terms applicable to each asset, the status of each lease, the current invoices for each asset, and/or other aspects of the lease of an asset. The interface may also allow the customer to determine the location of assets that are available for lease. In one embodiment, the interface may allow the customer to put an asset on hold in situations where the customer has to pick up the asset, or may allow the customer to start the lease. In another embodiment, the interface may allow the customer to pay invoices, or may allow the customer to select lease terms for the lease of an asset. Other embodiments in which the user accesses the customer section through handheld wireless devices such as personal digital assistants or handheld computers may also be used.

This system described herein provides numerous benefits to both the owner of the assets and the customer leasing these assets. Benefits to the owner of the assets include reducing overhead by minimizing the need to move assets from the owners storage area to the customer by allowing assets to be stored at a customer location(s) until needed by the customer. Overhead costs are also reduced by making it easier for the owner to track actual asset use, which could result in a more economical distribution of assets. The use of sensors to automatically detect when assets are in use reduces overhead costs because manual checking of asset status is not required. The leasing system is also more efficient in that an automatic billing system can be established where change in lease fees are dependant upon any number of factors, such as actual use time, seasonal use time, or distance traveled by the asset, or various combinations of these factors, and these factors are part of a verifiable system which uses minimal manpower.

It is to be understood that the present invention is not limited to the embodiments described above, but encompasses any and all embodiments within the scope of the following claims.

It will be apparent to those skilled in the art that various modifications and variation can be made in the system and method of use of the present invention without departing from the spirit or scope of the invention. Thus, it is intended that the present invention cover the modifications and variations of this invention provided they come within the scope of the appended claims and their equivalents.

What is claimed is:

1. A computer implemented method for administering a lease of geographically distributed assets, the method comprising:
    storing lease terms governing the leasing of a geographically distributed asset in a computerized management system, the lease terms including
    duration of the lease,
    lease rate terms, and
    at least three conditions of said lease including starting of the lease, the lease rate, and ending of the lease, said three conditions are verified by at least three distinct sensors, wherein the at least three conditions includes (i) opening of a door on the asset, (ii) the use of electricity on the asset, and (iii) the use of a refrigeration system on the asset, wherein the three distinct sensors include (i) a door switch to monitor position of the door on said asset, (ii) a current monitor to monitor the use of electricity by electrical equipment within said asset, and (iii) a temperature sensor which monitors the use of the refrigeration system within said asset;
    wherein said starting of the lease is determined by the opening of said door and by either applying the electricity or the refrigeration to said asset, or by applying the electricity and the refrigeration to said asset, and wherein at two lease rates are applied based on whether said asset is being cooled as measured by said temperature sensor or whether said asset is being powered as measured by said current monitor and wherein said ending of the lease is determined by closing said door as measured by said door switch, turning off said electricity as measured by said current monitor and turning off said refrigeration unit as measured by said temperature sensor,
    making available at least one asset to be leased, wherein the asset has a unique identifier;
    associating, within the computerized management system, lease terms governing the leasing of the asset with the unique identifier for the asset;
    monitoring status of the at least three conditions with said at least three distinct sensors in communication with the computerized management system;
    transmitting to the computerized management system via a communications system the status of the at least three conditions and the unique identifier of the asset;
    utilizing the computerized management system to monitor said lease based upon the status sensed by the at least three distinct sensors, the unique identifier of the asset, and the lease terms associated with the unique identifier of the asset;
    utilizing the computerized management system to determine an amount due based upon the terms of the lease associated with the asset through the unique identifier if the three conditions that start the lease have occurred;
    utilizing the computerized management system to periodically prepare an invoice using the determined amount due to a customer;
    utilizing the computerized management system to determine a final amount due based upon the terms of the lease associated with the asset through the unique identifier if the three conditions that end the lease have occurred; and
    utilizing the computerized management system to prepare a final invoice using the final amount due to the customer at the end of the lease.

2. The method of claim 1, wherein one of the at least three conditions is geographic location of the asset at a predetermined location or within a predetermined area and wherein one of the at least three distinct sensors is a locating sensor that determines the current geographic location of the asset.

3. The method of claim 1, wherein one of the at least three conditions is movement of the asset, and wherein one of the at least three distinct sensors is a motion sensor that senses the movement of the asset.

4. The method of claim 3, wherein the motion sensor is an accelerometer.

5. The method of claim 1, wherein one of the at least three conditions is a change in temperature of the asset indicative of use of the asset, and wherein one of the at least three distinct sensors is a thermometer that senses the temperature of the asset.

6. The method of claim 1, wherein one of the at least three conditions is presence of materials within the asset, and wherein one of the at least three distinct sensors is a contents sensor that senses the presence of materials within the asset.

7. The method of claim 1, wherein making available at least one asset to be leased comprises making available at least one asset in a secure storage yard having a security card reader that is connected to the computerized management system, wherein the use of an appropriate security card with the security card reader is transmitted to the computerized management system, and wherein said computerized management system allows access to the at least one asset upon use of the appropriate security card.

8. The method of claim 7, wherein the at least one asset in the secure storage yard is electronically immobilized, and wherein the computerized management system causes the immobilization to be removed from the asset upon use of the appropriate security card.

9. The method of claim 7, wherein the use of the appropriate security card with the security card reader triggers to starts or end the lease.

10. A system for administering a lease of geographically distributed assets, the system comprising:
- at least one asset to be leased, wherein the asset has a unique identifier;
- a computerized management system coupled to the at least one asset for establishing lease terms that govern the leasing of the geographically distributed asset, said lease terms include duration of the lease, lease rate terms and at least three conditions including starting of the lease, the lease rate, and ending of the lease, wherein said lease terms are associated with the unique identifier for the asset, wherein said at least three conditions include (i) opening of a door on the asset, (ii) the use of electricity on the asset and (iii) the use of the refrigeration system on the asset;
- at least three distinct sensors in the asset that function to verify the at least three conditions, wherein the at least wherein the three distinct sensors include (i) a door switch to monitor position of the door on said asset, (ii) a current monitor to monitor the use of electricity by electrical equipment within said asset, and (iii) a temperature sensor which monitors the use of the refrigeration system within said asset,
- wherein said starting of the lease is determined by the opening of said door and by either applying the electricity or the refrigeration to said asset, or by applying the electricity and the refrigeration to said asset, and wherein at two lease rates are applied based on whether said asset is being cooled as measured by said temperature sensor or whether said asset is being powered as measured by said current monitor and wherein said ending of the lease is determined by closing said door as measured by said door switch, turning off said electricity as measured by said current monitor and turning off said refrigeration unit as measured by said temperature sensor, and
- a communications transmission system coupled to the computerized management system for transmitting to the computerized management system the status of the at least three conditions and the unique identifier of the asset;
- wherein the computerized management system monitor said lease based upon the status sensed by the at least three distinct sensors, the unique identifier of the asset, and the lease terms associated with the unique identifier of the asset;
- wherein, the computerized management system calculates an amount due using the terms of the lease associated with the asset through the unique identifier if the at least three conditions that start the lease have occurred;
- wherein, the computerized management system periodically prepares an invoice using the calculated amount due to a customer;
- wherein the computerized management system calculates the amount due using the terms of the lease associated with the asset through the unique identifier if the three conditions that end the lease have occurred;
- wherein the computerized management system prepares a final invoice using the final amount due to the customer at the end of the lease.

11. The system of claim 10,
wherein the at least three conditions further include geographic location of the asset at a predetermined location the movement of the asset, a change in temperature of the asset indicative of use of the asset, the presence of materials within the asset or use of an appropriate security card with a security card reader.

12. The system of claim 10:
wherein the at least three distinct sensors further include a locating sensor, a motion sensor, a contents sensor or a thermometer.

13. The system of claim 10, further comprising a web-based interface to the computerized management system which allows a lessee to view information concerning the asset being leased.

14. The system of claim 13, wherein the interface to the computerized management system also allows a lessee to pay invoices for the asset being leased.

15. The system of claim 10, wherein the interface to the computerized management system allows a lessee to view information concerning the availability of new assets for leasing.

16. The system of claim 15, wherein the interface to the computerized management system allows a lessee to select lease the terms governing the lease of an asset and to select the asset for leasing.

* * * * *